United States Patent
Shin

(10) Patent No.: US 11,420,670 B2
(45) Date of Patent: Aug. 23, 2022

(54) STEER-BY-WIRE SYSTEM AND CONTROL METHOD THEREOF

(71) Applicant: MANDO CORPORATION, Gyeonggi-do (KR)

(72) Inventor: DongHoon Shin, Seoul (KR)

(73) Assignee: MANDO CORPORATION, Gyeonggi-Do (KR)

(*) Notice: Subject to any disclaimer, the term of this patent is extended or adjusted under 35 U.S.C. 154(b) by 389 days.

(21) Appl. No.: 16/546,262

(22) Filed: Aug. 20, 2019

(65) Prior Publication Data

US 2020/0062292 A1 Feb. 27, 2020

(30) Foreign Application Priority Data

Aug. 27, 2018 (KR) .................. 10-2018-0100197

(51) Int. Cl.
  *B62D 5/00* (2006.01)
  *B62D 15/02* (2006.01)
  *B62D 6/00* (2006.01)
  *B62D 5/04* (2006.01)

(52) U.S. Cl.
  CPC .......... *B62D 5/005* (2013.01); *B62D 5/0463* (2013.01); *B62D 6/008* (2013.01); *B62D 15/021* (2013.01)

(58) Field of Classification Search
  CPC ...... B62D 5/005; B62D 5/0463; B62D 6/008; B62D 15/021
  See application file for complete search history.

(56) References Cited

U.S. PATENT DOCUMENTS

| | | | |
|---|---|---|---|
| 8,140,222 B2 * | 3/2012 | Watanabe | B62D 5/0463 701/41 |
| 11,046,359 B2 * | 6/2021 | Shin | B62D 5/0481 |
| 2004/0238257 A1 * | 12/2004 | Takahashi | B62D 6/008 180/402 |
| 2017/0282972 A1 * | 10/2017 | Moretti | B60W 50/04 |
| 2018/0015945 A1 * | 1/2018 | Kim | B62D 6/003 |
| 2019/0031231 A1 * | 1/2019 | George | B62D 5/0463 |

* cited by examiner

*Primary Examiner* — Jacob D Knutson
(74) *Attorney, Agent, or Firm* — Ladas & Parry, LLP

(57) ABSTRACT

A steer-by-wire system and a control method thereof. A reaction motor generates a reaction in a direction opposite to a direction in which a steering wheel is manipulated by a driver. A current sensor senses a phase current output by the reaction motor. A motor position sensor senses an angle of rotation of the reaction motor. A state and disturbance observer estimates a plurality of state variables and a driver torque by receiving information regarding the phase current and information regarding the angle of rotation of the reaction motor. A reaction controller determines a reaction torque output by the reaction motor, in accordance with the plurality of state variables and the driver torque estimated by the state and disturbance observer. A steering intention of a driver is accurately determined when the torque sensor or the steering angle sensor is not provided or malfunctions.

12 Claims, 5 Drawing Sheets

STEER-BY-WIRE SYSTEM AND CONTROL METHOD THEREOF

CROSS REFERENCE TO RELATED APPLICATION

This application claims priority from Korean Patent Application No. 10-2018-0100197, filed on Aug. 27, 2018, which is hereby incorporated by reference for all purposes as if fully set forth herein.

BACKGROUND

Field

Embodiments relate to a steer-by-wire system and a control method thereof. More particularly, the embodiments relate to a steer-by-wire system and a control method thereof able to accurately determine a steering intention of a driver by estimating a plurality of state variables, by which the steering intention of the driver can be determined, even in a case in which a torque sensor or a steering angle sensor is provided or the torque sensor or the steering angle sensor malfunctions.

Description of Related Art

A steer-by-wire (SBW) system refers to an apparatus that generates a signal by detecting an operation of a driver manipulating a steering wheel and controls the steering of vehicle wheels using the signal, instead of using a mechanical structure connecting the steering wheel and the vehicle wheels.

In the SBW system, an input unit including the steering wheel may include a steering wheel sensor detecting a steering angle of the steering wheel, a torque sensor detecting a torque of a steering shaft of the steering wheel, a reaction motor providing a reaction torque in response to the rotation of the steering wheel, and the like. An output unit of the SBW system may include a steering output sensor detecting an angle of rotation of vehicle wheels, a steering motor generating assistance force to rotate the vehicle wheels, a steering motor position sensor detecting the position of a rotary shaft of the steering motor, and the like.

When the driver turns the steering wheel, an amount of rotation of the steering wheel and a torque of a torsion bar, detected by the steering angle sensor and the torque sensor, are transferred to an electronic control unit (ECU). The ECU responsively generates a current for controlling the steering of the vehicle wheels and provides the current to the steering wheel, thereby steering the vehicle wheels.

In addition, when the driver manipulates the steering wheel, the SBW system generates force in a direction opposite to the steering wheel using a reaction motor, thereby providing an appropriate level of steering feel to the driver.

However, it may be difficult for such an SBW system to accurately determine the steering intention of the driver, only using the steering angle and the torque. To compensate for this drawback, a method of controlling the reaction provided to the driver and the steering of the vehicle wheels by measuring a phase current of at least one of the reaction motor, the steering motor, or a combination thereof using current sensors was proposed. However, even in the case in which the current sensors are used, when the torque sensor or the steering angle sensor malfunctions, information regarding the torque of the torsion bar or information regarding the steering angle of the steering wheel may not be provided or may be erroneously provided, thereby causing the system to malfunction. Accordingly, there is demand for a method able to accurately determine the steering intention of the driver even in the case in which the torque sensor or the steering angle sensor malfunctions or the torque sensor or the steering angle sensor is not provided.

BRIEF SUMMARY

Various aspects provide a steer-by-wire (SBW) system and a control method thereof able to accurately determine a steering intention of a driver by estimating a plurality of state variables, by which the steering intention of the driver can be determined, even in a case in which a torque sensor or a steering angle sensor is not provided or the torque sensor or the steering angle sensor malfunctions.

According to an aspect, an SBW system may include: a reaction motor generating a reaction in a direction opposite to a direction in which a steering wheel is manipulated, in response to the steering wheel being manipulated by a driver; a current sensor sensing a phase current output by the reaction motor; a motor position sensor sensing an angle of rotation of the reaction motor; a state and disturbance observer estimating a plurality of state variables and a driver torque by receiving information regarding the phase current and information regarding the angle of rotation of the reaction motor; and a reaction controller determining a reaction torque output by the reaction motor, in accordance with the plurality of state variables and the driver torque estimated by the state and disturbance observer.

According to an aspect, a control method of an SBW system may include: sensing a phase current output by a reaction motor generating a reaction in a direction opposite to a direction in which a steering wheel is manipulated, in response to the steering wheel being manipulated by a driver; sensing an angle of rotation of the reaction motor; estimating a plurality of state variables and a driver torque by receiving information regarding the phase current and information regarding the angle of rotation of the reaction motor; and determining a reaction torque output by the reaction motor, in accordance with the plurality of state variables and the driver torque.

According to exemplary embodiments, it is possible to accurately determine a steering intention of a driver even in a case in which the torque sensor or the steering angle sensor is not provided or the torque sensor or the steering angle sensor malfunctions. Accordingly, it is possible to control the torque sensor and the steering angle sensor by accurately calculating the reaction torque provided to the reaction motor and the steering torque provided to the steering motor.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
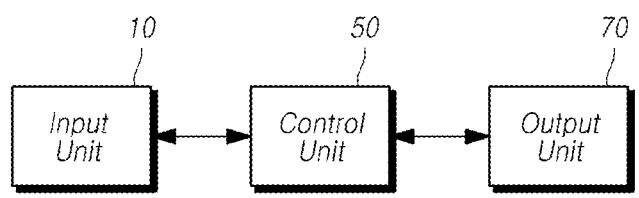
FIG. 1 is a block diagram illustrating an SBW system according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 is a block diagram illustrating a steer-by-wire (SBW) system according to embodiments.

The SBW system according to embodiments can accurately determine a steering intention of a driver by estimating a plurality of state variables and a driver torque even in a state in which a torque sensor or a steering angle sensor malfunctions or the torque sensor or the steering angle sensor is not equipped.

The SBW system may include an input unit 10 including a steering wheel 15, a control unit 50 estimating state variables including the driver torque, and an output unit 70 including a vehicle wheel 85.

Figure 2:
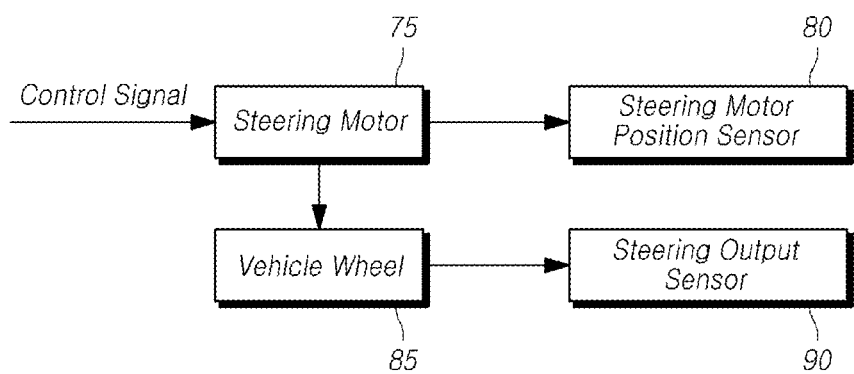
FIG. 2 is a block diagram schematically illustrating the configuration of the output unit of the SBW system.

FIG. 2 is a block diagram schematically illustrating the configuration of the output unit of the SBW system.

The output unit 70 may include, on an output side, a steering output sensor 90 able to sense angle of rotation $\theta_{cm}$ of the vehicle wheel, a steering motor 75 generating assistance force to rotate the vehicle wheel 85, a steering motor position sensor 80 sensing the position of a rotary shaft of the steering motor 75, and the like.

A control single regarding a current, calculated by the input unit 10 and provided to the steering motor 75, is provided to the output unit 70, so that the vehicle wheel 85 can be steered to a steering angle intended by the driver, in response to the operation of the steering motor 75.

Figure 3:
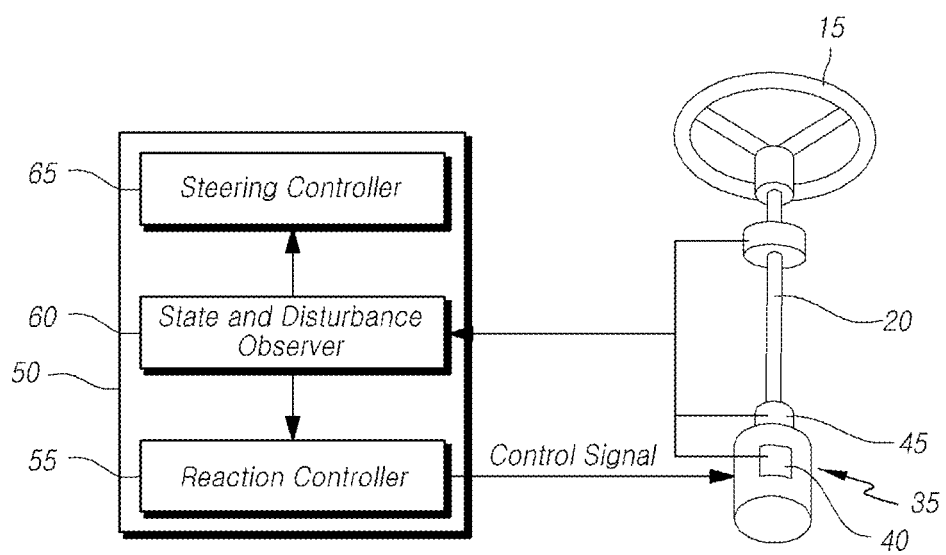
FIG. 3 is a block diagram illustrating the relationship between the input unit and the control unit of the SBW system according to embodiments.

FIG. 3 is a block diagram illustrating the relationship between the input unit and the control unit of the SBW system according to embodiments.

The input unit 10 may include the steering wheel 15, a reaction motor 35, a motor position sensor 40, and current sensors 45, while the control unit 50 may include a reaction controller 55, a state and disturbance observer 60, and a steering controller 65.

When the driver manipulates the steering wheel 15, the reaction motor 35 generates a force in a direction opposite to the steering wheel 15, thereby providing an appropriate level of steering feel to the driver. A current is provided to the reaction motor 35 to generate a suitable amount of reaction torque, thereby generating the steering feel.

The motor position sensor 40 can generate a voltage signal in response to the rotation of the reaction motor 35 and sense an angle of rotation $\theta_{cm}$ of the reaction motor 35 in real time using the voltage signal. The motor position sensor 40 can transfer information regarding the angle of rotation $\delta_{cm}$ of the reaction motor 35 to the state and disturbance observer 60.

The current sensors 45 can obtain a fundamental wave current in a single pulse width modulation (PWM) period, i.e. an average current, by sensing the phase current of the reaction motor. In general, the current sensors 45 are provided as a pair of current sensors to sense a phase current, and sense of the phase current is essential for torque control.

The reaction controller 55 of the control unit 50 may control the reaction motor 35 to have a calculated reaction torque, and the steering controller 65 may control the steering motor 75 to steer the vehicle wheel 85 at a steering angle intended by the driver.

The state and disturbance observer 60 may estimate a plurality of state variables and a driver torque to determine the steering intention of the driver using a Kalman filter, and in response to the use of the Kalman filter, estimate the plurality of state variables and the driver torque using data provided by the motor position sensor 40 and the current sensor 45 of a steering column 20.

The reaction controller 55 may receive estimated values of the plurality of state variables and the driver torque from the state and disturbance observer 60, determine a reaction torque to be output by the reaction motor 35 using the estimated values of the plurality of state variables, and output a control signal regarding a reaction motor input voltage provided to the reaction motor 35 to output the determined reaction torque.

In this regard, the reaction controller 55 possesses information regarding reaction torque reference values corresponding to the state variables and the driver torque estimated by the state and disturbance observer 60, and may determine the reaction torque using the state variables and the driver torque provided by the state and disturbance observer 60. In addition, the reaction controller 55 possesses information regarding the reaction motor input voltage to be provided to the reaction motor 35 to generate the determined reaction torque, and when the reaction torque is determined, a control signal, instructing the reaction motor input voltage corresponding to the reaction torque to be provided to the reaction motor 35, is generated.

Although the reaction control 55 may receive estimated values of all of the state variables from the state and disturbance observer 60, information regarding the angle of rotation $\theta_{cm}$ of the reaction motor 35 and information regarding the phase current may be provided directly from the motor position sensor 40 and the current sensors 45, and the estimated values of the other state variables and the driver torque may be provided from the state and disturbance observer 60.

The steering controller 65 may determine the steering torque output by the steering motor 75, using the estimated values of the plurality of state variables provided from the state and disturbance observer 60. When the steering torque is determined, the steering controller 65 may output a control signal regarding a steering motor input voltage that must be provided to the steering motor 75 to generate the determined steering torque.

In this regard, the steering controller 65 possesses information regarding steering torque reference values corresponding to the estimated values of the state variables, and may determine the steering torque using the state variables and torque reference values provided from the state and disturbance observer 60. In addition, the steering controller 65 possesses information regarding the steering motor input voltage to be provided to the steering motor 75 to generate the determined steering torque. When the steering torque is determined, the steering controller 65 may generate a control signal, instructing the steering motor input voltage corresponding to the steering torque to be provided to the steering motor 75.

Figure 4:
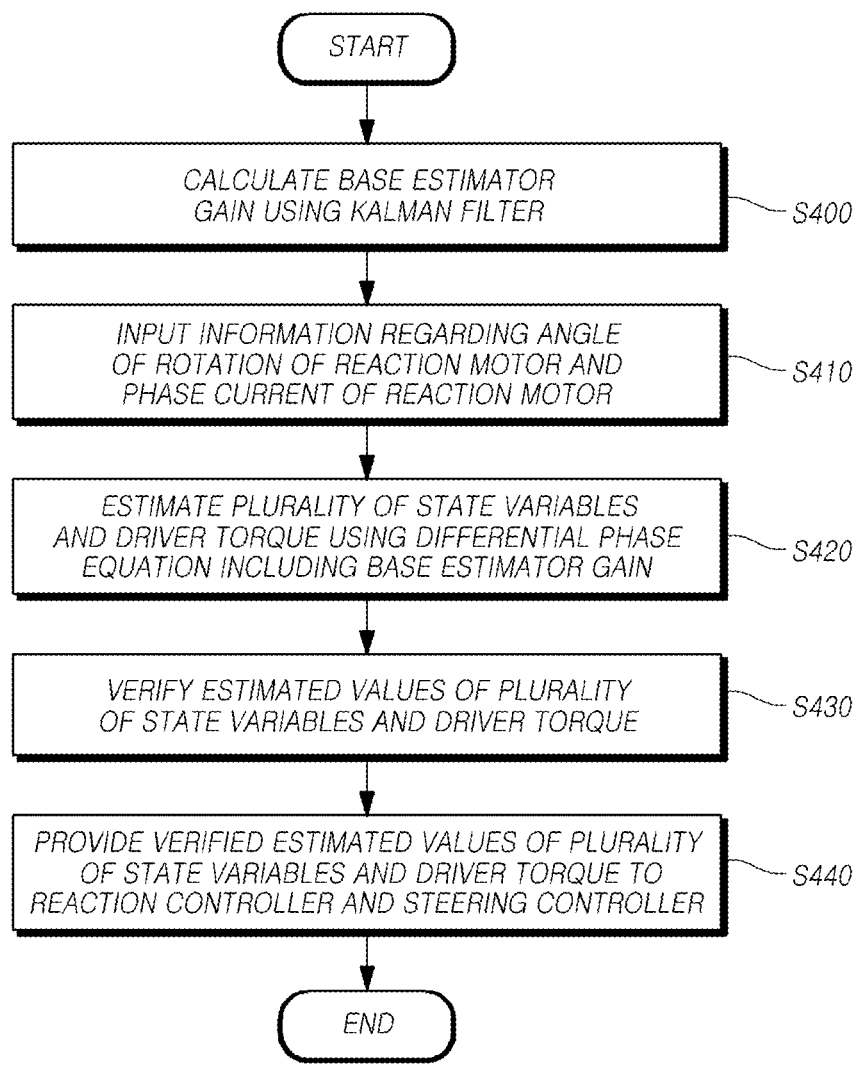
FIG. 4 is a flowchart illustrating a process of estimating state variables by the state and disturbance observer of the SBW system according to embodiments.

As illustrated in a flowchart of FIG. 4, the state and disturbance observer 60 may receive information regarding the angle of rotation $\theta_{cm}$ of the reaction motor 35 and information regarding the phase current of the reaction motor 35 from the motor position sensor 40 and the current sensor 45, respectively, and estimate or calculate an angular speed of the steering wheel 15, a difference between the angular speed of the steering wheel 15 and an angular speed of the motor, and a driver torque $\tau_{drv}$.

The state and disturbance observer 60 calculates a base estimator gain K defined using the Kalman filter and possesses information regarding the calculated estimator gain in S400.

The base estimator gain, calculated by the state and disturbance observer 60, may be defined by following Formula 1.

$$K = \text{Kalman}(A_{new}, C_{new}, W, V) \quad \text{[Formula 1]}$$

When information regarding the angle of rotation $\theta_{cm}$ of the reaction motor 35 and information regarding the phase current of the reaction motor 35 is input to the state and disturbance observer 60 in S410, the state and disturbance observer 60 may calculate estimated values of a plurality of state variables by applying the information to a differential phase equation of Formula 2 in S420.

The plurality of state variables may include the driver torque, the angle of rotation of the steering wheel 15, the steering angular speed of the steering wheel 15, a torsion bar torque, an angular speed difference, and the like. Here, angular speed difference is a difference between the steering angular speed of the steering wheel 15 and an angular speed of the reaction motor 35. The angular speed of the reaction motor may be calculated by dividing the torsion bar torque, sensed by the motor position sensor 40, with a unit time.

$$\dot{z}_a = A_{new}\hat{z}_a + B_{new}u + K(y - \hat{y}), \quad \text{[Formula 2]}$$

where K indicates the base estimator gain of Formula 1, and y, $A_{new}$, and $B_{new}$ may be defined by following Formulas 3, 4, and 5:

$$Y = C_{new} z_a, \quad \text{[Formula 3]}$$

where $C_{new}$ may be defined by Formula 3-1, and $\dot{z}_a$ may be defined by Formula 3-2.

$$C_{new} = [0 \, C_z], \quad \text{[Formula 3-1]}$$

where $C_z$ may be defined by Formula 3-1-1.

$$C_z = \begin{bmatrix} 1 & 0 & -\dfrac{1}{K_{sen}} & 0 \end{bmatrix}, \quad \text{[Formula 3-1-1]}$$

where $K_{sen}$ is a torsion bar rigidity index.

$$Z_a = [\tau_{drv}, \theta_{sw}, \omega_{sw}, \tau_t, \omega_d], \quad \text{[Formula 3-2]}$$

where $\tau_{drv}$ indicates the driver torque, $\theta_{sw}$ indicates a steering angle of the steering wheel 15, $\omega_{sw}$ indicates the steering angular speed of the steering wheel 15, $\tau_t$ indicates the torsion bar torque, and $\omega_d$ indicates the angular speed of the reaction motor.

$A_{new}$ may be defined by Formula 4.

$$A_{new} = \begin{bmatrix} 0 & 0_{1\times 4} \\ 0_{4\times 1} & A_2 \end{bmatrix}, \quad \text{[Formula 4]}$$

where $A_z$ may be defined by Formula 4-1.

$$A_{new} = \begin{bmatrix} 0 & 1 & 0 & 0 \\ 0 & -\dfrac{B_{sw}}{J_{sw}} & -\dfrac{1}{J_{sw}} & -\dfrac{B_{sen}}{J_{sw}} \\ 0 & 0 & 0 & K_{sen} \\ 0 & \alpha_1 & \alpha_2 & \alpha_3 \end{bmatrix}, \quad \text{[Formula 4-1]}$$

where $B_{sw}$ indicates a damping coefficient of the steering wheel, $B_{sen}$ indicates a damping coefficient of the torsion bar, and $J_{sw}$ indicates an inertia of the steering wheel. In addition, $\alpha_1$, $\alpha_2$, and $\alpha_3$ are expressed by Formulas 4-1-1, 4-1-2, and 4-1-3.

$$\alpha_1 = -\dfrac{B_{sw}J_{cm} - B_{cm}J_{sw}}{J_{cm}J_{sw}}, \quad \text{[Formula 4-1-1]}$$

where $B_{cm}$ indicates a damping coefficient of the reaction motor, and $J_{cm}$ indicates an inertia of the reaction motor.

$$\alpha_2 = -\dfrac{J_{cm} + J_{sw}}{J_{cm}J_{sw}}, \quad \text{[Formula 4-1-2]}$$

$$\alpha_3 = -\dfrac{B_{cm}J_{sw} + B_{sen}J_{sw} + B_{sen}J_{cm}}{J_{sw}J_{cm}}, \quad \text{[Formula 4-1-3]}$$

where may be defined by Formula 5.

$$B_{new} = \begin{bmatrix} 0 \\ B_z \end{bmatrix}, \quad \text{[Formula 5]}$$

where $B_z$ may be defined by Formula 5-1.

$$B_{new} = \begin{bmatrix} 0 \\ 0 \\ 0 \\ \dfrac{1}{J_{cm}} \end{bmatrix} \quad \text{[Formula 5-1]}$$

The differential phase equation of Formula 2 is modified by differentiating a differential phase equation of Formula 6 and applying the Kalman filter so that the plurality of state variables can be estimated.

$$\dot{z}_a = A_{new} z_a + B_{new} u + B_w \dot{\tau}_{drv} \quad \text{[Formula 6]}$$

Formula 5-1 is a first derivative of the driver torque.

The phase equation of Formula 6 is obtained by modifying a phase equation of Formula 7.

$$\dot{z} = A_z B_2 u + B_{z\_drv} \tau_{drv}, \quad \text{[Formula 7]}$$

where z, $A_z$, $B_z$, and $B_{z\_drv}$ may be defined by Formulas 7-1 to 7-4.

$$z = \begin{bmatrix} z_1 \\ z_2 \\ z_3 \\ z_4 \end{bmatrix} = \begin{bmatrix} \theta_{sw} \\ \dot{\theta}_{sw} \\ \tau_t \\ \omega_d \end{bmatrix} = T_x \quad \text{[Formula 7-1]}$$

$$A_z = T A_z T^{-1} \quad \text{[Formula 7-2]}$$

$$B_z = TB \quad \text{[Formula 7-3]}$$

$$B_{z\_drv} = T B_{drv} \quad \text{[Formula 7-4]}$$

T used in Formulas 7-1 to 7-4 may be defined by Formula 7-5.

$$T = \begin{bmatrix} 1 & 0 & 0 & 0 \\ 0 & 1 & 0 & 0 \\ K_{sen} & 0 & -K_{sen} & 0 \\ 0 & 1 & 0 & -1 \end{bmatrix} \quad \text{[Formula 7-5]}$$

The relationship between $C_z$ and T defined in Formula 3-1-1 may be defined by Formula 8.

$$C_z = CT \quad \text{[Formula 8]}$$

As described above, the differential phase equation of the state and disturbance observer 60, defined by Formula 2, has the damping coefficient of the steering wheel, the damping coefficient of the torsion bar, the damping coefficient of the reaction motor, the inertia of the steering wheel, and the inertia of the reaction motor applied thereto, as expressed in Formulas 4-1 to 5-1. In addition, the differential phase equation of the state and disturbance observer 60 is a function related to the driver torque, the steering angle of the steering wheel 15, the steering angular speed of the steering wheel 15, the torsion bar torque, and the angular speed of the reaction motor. The driver torque, the torsion bar torque, the steering angle of the steering wheel 15, the steering angular speed of the steering wheel 15, a difference in the angular speed between the steering wheel 15 and the reaction motor, and the like, can be estimated by inputting the angle of rotation of the reaction motor 35 and the phase current sensed by the current sensor 45 and applying the Kalman filter of Formula 1 to the differential phase equation of the state and disturbance observer 60.

When the state and disturbance observer 60 estimates the state variables including the driver torque using the Kalman filter in this manner, white noise, such as torque ripples introduced to the steering column, can be removed.

The state and disturbance observer 60 may perform the process of verifying whether or not the values of the state variables, estimated by the state and disturbance observer 60, are accurate by comparing the estimated values of the state variables with state variables sensed by the motor position sensor 40 and the current sensor 45 in S430. If any of the values of the state variables, estimated by the state and disturbance observer 60, differs from the corresponding one of the state variables sensed by the motor position sensor 40 and the current sensor 45 by a predetermined value or more, the state and disturbance observer 60 may repeat the step of state variable estimation.

When the verification is completed, the estimated values of the state variables, calculated by the state and disturbance observer 60, may be provided to the reaction controller 55 and the steering controller 65, respectively, in S440.

Figure 5:
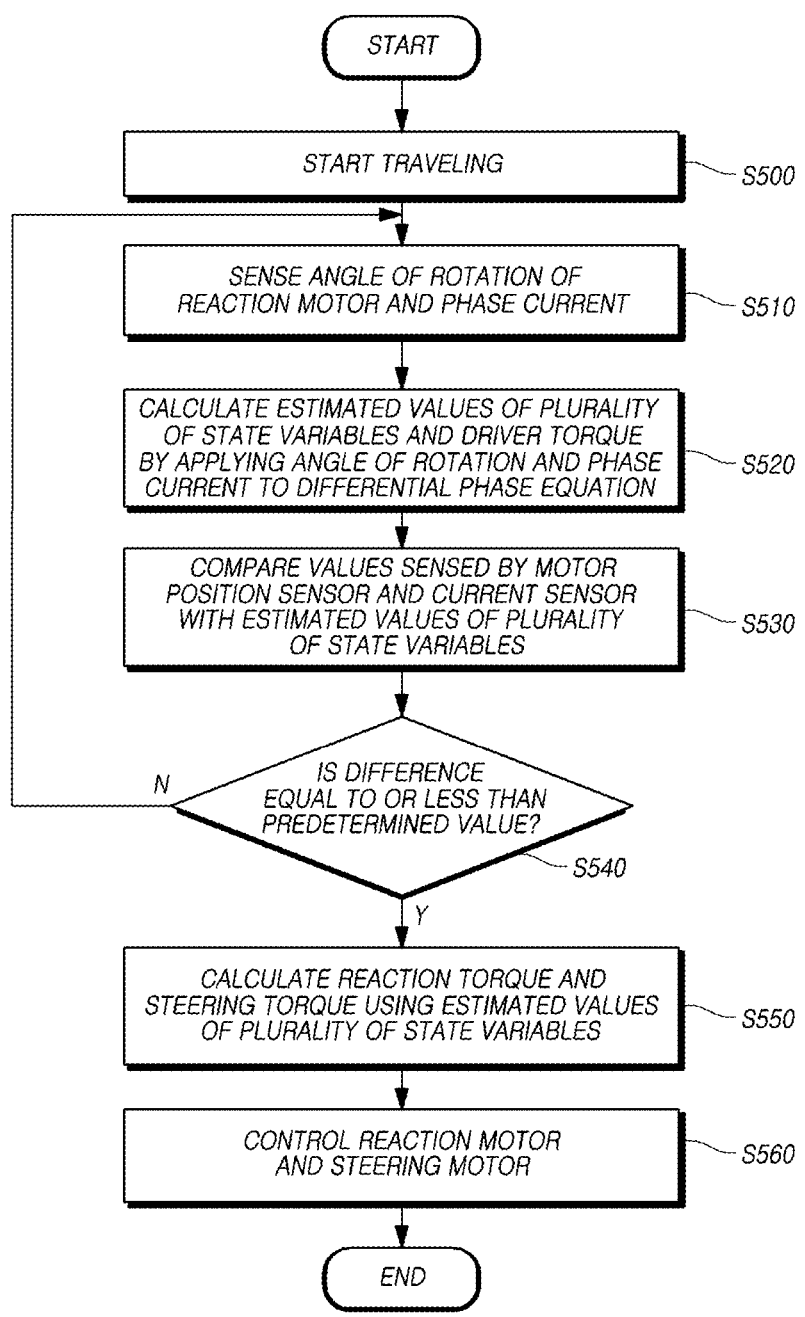
FIG. 5 is a flowchart illustrating a control process of the SBW system according to embodiments.

Hereinafter, the process of calculating the estimated values of the state variables for determination of the reaction torque, performed by the state and disturbance observer 60 of the SBW system using the above-described configuration, will be described with reference to FIG. 5.

When a vehicle starts traveling in S500, the motor position sensor 40 and the current sensor 45 may sense the angle of rotation $\theta_{cm}$ of the reaction motor 35 and the phase current, respectively, and transfer the detected values to the state and disturbance observer 60, respectively, in S510.

The state and disturbance observer 60 may estimate the plurality of state variables by applying the angle of rotation $\theta_{cm}$ of the reaction motor 35 and the phase current, received from the motor position sensor 40 and the current sensor 45, as well as the damping coefficient of the steering wheel 15, the damping coefficient of the torsion bar, the damping coefficient of the reaction motor 35, the inertia of the steering wheel, and the inertia of the reaction motor 35, to a differential phase equation in S520.

The state variables estimated in this case may include the driver torque, the torsion bar torque, the steering angle of the steering wheel 15, the steering angular speed of the steering wheel 15, the difference in the angular speed between the steering wheel 15 and the reaction motor 35, and the like.

The state and disturbance observer 60 may compare the estimated values of the state variables, calculated in this manner, with the angle of rotation $\theta_{cm}$ of the reaction motor 35 sensed by the motor position sensor 40 and the current sensor 45, the phase current sensed by the reaction motor 35, and a motor input voltage provided to the reaction motor 35 in S530. If the estimated values of the state variables calculated by the state and disturbance observer 60 differ from the state variables sensed by the sensors beyond a predetermined value, as indicated with N in S540, the state and disturbance observer 60 may re-estimate the state variables until the difference is not greater than the predetermined value.

When the verification is completed, the estimated values of the plurality of state variables, calculated and verified by the state and disturbance observer 60, may be provided to the reaction controller 55 and the steering controller 65 in S550. In S560, the reaction controller 55 may determine the reaction torque of the reaction motor 35 using the estimated values of the state variables and provide a control signal for a motor input voltage, corresponding to the determined reaction torque, to the reaction motor 35, and the steering controller 65 may determine the steering torque of the steering motor 75 using the estimated values of the state variables and provide a control signal for a steering motor input voltage, corresponding to the determined steering torque, to the steering motor 75.

Although it has been described that a torque sensor is not provided in the foregoing embodiments, the torque sensor may be provided. In this situation, it is possible to verify a torsion bar torque sensed by the torque sensor by comparing the torsion bar torque sensed by the torque sensor with the torsion bar torque estimated by the state and disturbance observer 60.

If the torsion bar torque sensed by the torque sensor is beyond a predetermined range from the torsion bar torque estimated by the state and disturbance observer 60, the torque sensor may be determined as malfunctioning, and the reaction motor 35 and the steering motor 75 may be controlled using the torsion bar torque estimated by the state and disturbance observer 60. That is, in a situation in which the torque sensor is provided, it may be determined whether or not the torque sensor malfunctions using the state and disturbance observer 60. If the torque sensor malfunctions, the torsion bar torque estimated by the state and disturbance observer 60 may be used. Accordingly, it is possible to accurately determine the steering intention of the driver even in a case in which the torque sensor malfunctions.

In addition, although it has been described that a steering angle sensor is not provided in the foregoing embodiments, the steering angle sensor may be provided. In this situation, it is possible to verify a steering angle of the steering wheel 15 sensed by the steering angle sensor by comparing the steering angle of the steering wheel 15, sensed by the steering angle sensor, with the steering angle of the steering wheel 15 estimated by the state and disturbance observer 60.

If the steering angle of the steering wheel 15, sensed by the steering angle sensor is beyond a predetermined range from the steering angle of the steering wheel 15 estimated by the state and disturbance observer 60, the steering angle sensor may be determined as malfunctioning, and the reaction motor 35 and the steering motor 75 may be controlled using the steering angle of the steering wheel 15 estimated by the state and disturbance observer 60. That is, in a situation in which the steering angle sensor is provided, it may be determined whether or not the steering angle sensor malfunctions using the state and disturbance observer 60. If the steering angle sensor malfunctions, the steering angle of the steering wheel 15, estimated by the state and disturbance observer 60, may be used. Accordingly, it is possible to accurately determine the steering intention of the driver even in a case in which the steering angle sensor malfunctions.

As set forth above, the SBW system according to embodiments may accurately calculate the estimated values of the state variables, including the driver torque, the torsion bar torque, the steering angle of the steering wheel 15, the steering angular speed of the steering wheel 15, the difference in the angular speed between the steering wheel 15 and the reaction motor 35, and the like, by the state and disturbance observer 60 using the Kalman filter. Accordingly, it is possible to control the reaction motor 35 and the steering motor 75 by accurately calculating the reaction torque provided to the reaction motor 35 and the steering torque provided to the steering motor 75. In addition, even in a case in which the torque sensor and the steering sensor are provided, the estimated values of the state variables, calculated by the state and disturbance observer 60, may be used to determine whether or not any of the torque sensor and the steering angle sensor malfunctions. Accordingly, the system may operate ordinarily even in a case in which any of the sensors malfunctions.

Although all of the components of the foregoing embodiments of the present disclosure may have been explained as combined or operatively connected as a unit, the present disclosure is not intended to be limited to the embodiments shown. Rather, the respective components may be selectively and operatively combined in any numbers without departing from the scope of the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer-by-wire system comprising:
   a reaction motor generating a reaction in a direction opposite to a direction in which a steering wheel is manipulated, in response to the steering wheel being manipulated by a driver;
   a current sensor sensing a phase current output by the reaction motor;
   a motor position sensor sensing an angle of rotation of the reaction motor;
   a state and disturbance observer estimating a plurality of state variables and a driver torque by receiving information regarding the phase current and information regarding the angle of rotation of the reaction motor, and at least one information of a damping coefficient of the steering wheel, a damping coefficient of the reaction motor, an inertia of the steering wheel, or an inertia of the reaction motor; and
   a reaction controller determining a reaction torque output by the reaction motor, in accordance with the plurality of state variables and the driver torque estimated by the state and disturbance observer,
   wherein estimated values of plurality of state variables, calculated by the state and disturbance observer, include at least one of a driver torque, a steering angle of the steering wheel, a steering angular speed of the steering wheel, a torsion bar torque, a difference in angular speed between the steering wheel and the reaction motor, or combinations thereof.

2. The steer-by-wire system according to claim 1, wherein the state and disturbance observer possesses information regarding a base estimator gain defined using a Kalman filter and estimates the plurality of state variables by applying the base estimator gain to a differential phase equation.

3. The steer-by-wire system according to claim 1, further comprising:
   a steering motor steering a vehicle wheel; and
   a steering controller controlling a steering torque output by the steering motor by receiving estimated values of the plurality of state variables from the state and disturbance observer.

4. The steer-by-wire system according to claim 1, wherein the state and disturbance observer recalculates estimated values of the plurality of state variables if the plurality of state variables differ from at least one of the information regarding the angle of rotation of the reaction motor, the information regarding the phase current of the reaction motor, or a combination thereof, by a predetermined value or more.

5. The steer-by-wire system according to claim 1, further comprising a torque sensor sensing a torque occurring in response to the steering wheel being manipulated,
wherein the state and disturbance observer determines whether or not the torque sensor malfunctions by comparing a torsion bar torque sensed by the torque sensor with a torsion bar torque estimated by the state and disturbance observer.

6. The steer-by-wire system according to claim 1, further comprising a steering angle sensor sensing a steering angle of the steering wheel,
wherein the state and disturbance observer determines whether or not the steering angle sensor malfunctions by comparing a steering angle of the steering wheel, sensed by the steering wheel sensor, with a steering angle of the steering wheel, estimated by the state and disturbance observer.

7. A control method of a steer-by-wire system, comprising:
sensing a phase current output by a reaction motor generating a reaction in a direction opposite to a direction in which a steering wheel is manipulated, in response to the steering wheel being manipulated by a driver;
sensing an angle of rotation of the reaction motor;
estimating a plurality of state variables and a driver torque by receiving information regarding the phase current and information regarding the angle of rotation of the reaction motor, and at least one information of a damping coefficient of the steering wheel, a damping coefficient of the reaction motor, an inertia of the steering wheel, or an inertia of the reaction motor; and
determining a reaction torque output by the reaction motor, in accordance with the plurality of state variables and the driver torque,
wherein estimated values of the plurality of state variables include at least one of a driver torque, a steering angle of the steering wheel, a steering angular speed of the steering wheel, a torsion bar torque, a difference in angular speed between the steering wheel and the reaction motor, or combinations thereof.

8. The control method according to claim 7, wherein the estimation of the plurality of state variables estimates the plurality of state variables by applying a base estimator gain defined using a Kalman filter to a differential phase equation.

9. The control method according to claim 7, further comprising controlling a current provided to a steering motor of a vehicle wheel by receiving estimated values of the plurality of state variables.

10. The control method according to claim 7, further comprising recalculating estimated values of the plurality of state variables if the plurality of state variables differ from at least one of the information regarding the angle of rotation of the reaction motor, the information regarding the phase current of the reaction motor, or a combination thereof, by a predetermined value or more.

11. The control method according to claim 7, further comprising:
sensing, by a torque sensor, a torsion bar torque of a steering column; and
determining whether or not the torque sensor malfunctions by comparing the torsion bar torque, sensed by the torque sensor, with a torsion bar torque from among estimated values of the plurality of state variables.

12. The control method according to claim 7, further comprising:
sensing, by a steering angle sensor, a steering angle of the steering wheel; and
determining whether or not the steering angle sensor malfunctions by comparing the steering angle of the steering wheel, sensed by the steering wheel sensor, with a steering angle of the steering wheel from among estimated values of the plurality of state variables.

* * * * *